United States Patent Office 2,803,629
Patented Aug. 20, 1957

2,803,629

QUATERNARY SALTS OF PYRIMIDYLAMINO-PHENANTHRIDINES

Wallace Frank Short, deceased, late of Sherwood Rise, Nottingham, England, by Kathleen Short, executrix, Sherwood Rise, Nottingham, and Thomas Iswel Watkins, West Bridgeford, Nottingham, England No Drawing. Application June 28, 1956,
Serial No. 594,382

6 Claims. (Cl. 260—256.4)

The present invention relates to new heterocyclic compounds which have been found to possess valuable trypanocidal activity.

The new compounds according to the invention are of the general formula

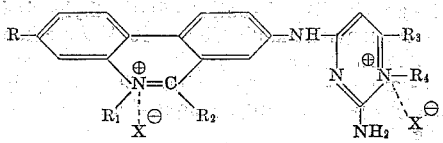

wherein R represents an amino group, $R_1$, $R_3$ and $R_4$ represent lower alkyl groups containing less than 6 carbon atoms, $R_2$ represents phenyl or nitro or amino substituted phenyl radicals and X is a non-toxic anion, for example, chloride, bromide, iodide and methyl sulphonate. These compounds have been found to possess properties which render them valuable trypanocides. The trypanocidal activity of such compounds is not only one that will cure already existing infections, but it is prolonged so as to give prophylactic protection against subsequent infection for a number of months after administration. The administration of such compounds is preferably by intramuscular injection of solutions thereof in water, for example, a 2% w./v. solution in water. The prophylactic activity of the compounds according to the invention is very marked and in some instances lasts up to six months. For example, when cattle were injected intramuscularly with an aqueous solution of 2-amino-7-($2^1$-amino-$6^1$-methylpyrimidyl-$4^1$-amino)-9-p-aminophenylphenanthridine 10:$1^1$-dimethobromide, at a dosage rate of 1 mgm./kilogram body weight, and challenged six months after the injection with a heavy infectious dose of the strain Godegode II of *T. congolense*, no trypanosomes were evident in their blood stream in the daily examinations for three weeks after the challenge. All control cattle, on the other hand, showed the presence of trypanosomes in the blood stream within 11 days after the challenge.

The compounds according to the invention can be prepared by condensing a phenanthridine of the general formula

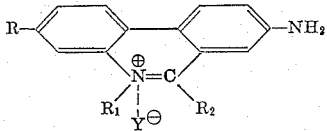

where R, $R_1$ and $R_2$ are as hereinbefore defined and Y is an anion which may be identical with X as hereinbefore defined, with a halopyrimidine of the formula

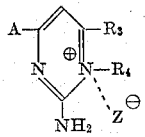

where A represents a halogen atom, $R_3$ and $R_4$ are as hereinbefore defined and Z is an anion which may be identical with X as hereinbefore defined. Where the anions Y and Z are not identical with X the product may be treated so as to replace Y and Z by X. If in the starting materials $R_2$ represents nitroaryl the initial condensation product may be subjected to reduction to convert the 9-nitroaryl group to 9-aminoaryl.

The following non-limitative examples illustrate the invention:

Example 1

In the preparation of 2-amino-7-(2'-amino-6'-methylpyrimidyl-4'-amino)-9-phenylphenanthridine 10:1'-dimethomethanesulphonate dihydrate a mixture of 1.86 grams of 2:7 - diamino - 10 - methyl - 9 - phenylphenanthridinium bromide, 1.5 grams of 2-amino-4-chloro-6-methylpyrimidine 1-methiodide, 5 cc. of N-hydrochloric acid and 20 cc. of water is heated under reflux for 45 minutes before being cooled to room temperature. The product which separates is isolated by filtration, dissolved in 200 cc. of hot water and the solution is treated with 3 grams of sodium iodide. The resulting solution is allowed to cool to room temperature and the solid which separates is isolated by filtration and is recrystallised from water to obtain 2-amino-7-(2'-amino - 6' - methylpyrimidyl - 4'amino) - 9 - phenylphenanthridine 10:1'-dimethiodide in the form of a red crystalline solid which has a melting point higher than 350° C. although shrinkage and some decomposition of the material occur at 281° C.

A mixture of 1.55 grams of the latter compound and 0.93 gram of silver methanesulphonate in 25 cc. of ethyl alcohol is heated under reflux for 15 minutes. The silver iodide which separates is removed by filtration and the filtrate is concentrated to 15 cc. before allowing to stand. The solid which separates is isolated by filtration and is dried. There is thus obtained 2-amino-7-(2'-amino-6'-methylpyrimidyl-4'-amino)-9-phenylphenanthridine 10:1'-dimethomethanesulphonate dihydrate in the form of a red crystalline solid which has a melting point of 238–240° C. (with decomposition). (Found: N, 13.15; $C_{28}H_{33}O_6N_6S_2 2H_2O$ requires N,13.0.)

Example 2

In the preparation of 2-amino-7-($2^1$-amino-$6^1$-methylpyrimidyl-$4^1$-amino)-9-p-nitrophenylphenanthridine 10:$1^1$-dimethochloride a mixture of 2.85 g. of 2:7-diamino-10-methyl-9-p-nitrophenyl-phenanthridinium bromide, 1.85 g. of 2-amino-4-chloro-6-methyl-pyrimidine methiodide, 6.6 cc. of N-hydrochloric acid and 50 cc. of water is heated under reflux for 45 minutes. The solution is cooled to room temperature and the solid which separates is isolated by filtration. The dried solid is ground with 3 g. of silver methanesulphonate and the mixture is boiled with 200 cc. of water for 1 hour. The resulting mixture is filtered and the filtrate is treated with 25 g. of ammonium chloride to precipitate a mixture of the required methochloride and silver chloride. This mixture is isolated by filtration and is extracted with two successive portions each of 100 cc. of hot water. The combined extracts are filtered and treated with ammonium chloride when the solid which separates is isolated by filtration and recrystallised from methyl alcohol. There is thus obtained 2-amino-7-($2^1$-amino - $6^1$ - methylpyrimidyl - $4^1$ - amino) - 9 - p - nitrophenylphenanthridine 10:$1^1$-dimethochloride in the form of a red crystalline solid which has a melting point higher than 300° C. [Found N, 14.8; $H_2O$, 14.8: $C_{26}H_{25}O_2N_7Cl_2.6H_2O$ requires N, 15.1; $H_2O$, 16.7.]

Example 3

In the preparation of 2-amino-7-($2^1$-amino-$6^1$-methylpyrimidyl - $4^1$ - amino) - 9 - p - aminophenylphenanthridine 10:$1^1$-dimethobromide 2 g. of 2-amino-7-($2^1$-amino-$6^1$ - methylpyrimidyl - $4^1$ - amino) - 9 - p - nitrophenylphenanthridine 10:1¹-dimethochloride (prepared as described in Example 4) is dissolved in 150 cc. of water and the solution is treated at 95° C. with stirring with a sludge prepared by mixing saturated solutions containing 11.2 g. of ferrous sulphate heptahydrate and 12 g. of barium hydroxide octahydrate. The mixture is heated with stirring for a further 30 minutes and is filtered whilst hot. The filtrate is treated in the same manner as above with a sludge prepared by mixing saturated solutions containing 3.7 g. of ferrous sulphate heptahydrate and 4 g. of barium hydroxide octahydrate. The mixture is heated at 95–100° C. with stirring for a further 15 minutes before being filtered. The filtrate is treated with 50 g. of ammonium bromide and the solution is allowed to stand overnight at room temperature. The solid which separates is isolated by filtration and crystallised from water. There is thus obtained 2-amino-7-(2¹-amino-6¹-methyl-pyrimidyl-4¹-amino)-9-p-aminophenylphenanthridine 10:1¹-dimethobromide in the form of a red crystalline solid which has a melting point higher than 300° C. [Found N, 16.3; Br, 26.1; $C_{26}H_{27}N_7Br_2$ requires N, 16.4; Br, 26.8.]

*Example 4*

In the preparation of 2-amino-7-(2¹-amino-6¹-methyl-pyrimidyl-4¹-amino)-9-phenylphenanthridine 10-ethiodide 1¹-methiodide, a mixture of 2.75 g. of 2:7-diamino-9-phenyl-10-ethylphenanthridinium bromide 2 g. of 2-amino-4-chloro-6-methylpyrimidine 1-methiodide, 7 cc. of N hydrochloric acid and 30 cc. of water is heated under reflux for 1 hour and 2 g. of potassium iodide is added to the hot solution. The solution is cooled and the solid which separates is isolated by filtration and is recrystallised from 500 cc. of water containing 15 g. of potassium iodide. There is thus obtained 2-amino-7-(2¹-amino-6¹-methylpyrimidyl-4¹-amino)-9-phenylphenanthridine 10-ethiodide 1¹-methiodide in the form of a red crystalline solid which has a melting point higher than 250° C. [Found N, 12.0; $C_{27}H_{28}N_6I_2$ requires N, 12.2.]

The above compound is treated with silver methane sulphonate in the manner described in Example 1 to obtain 2-amino-7-(2¹-amino-1¹:6¹-dimethylpyrimidyl-4¹-amino)-9-phenyl-10-ethylphenanthridinium dimethane-sulphonate monohydrate in the form of a yellow crystalline solid which has a melting point of 245° C. with decomposition [Found N, 13.1; $H_2O$, 3.1: $C_{29}H_{34}O_6N_6S_2 \cdot H_2O$ requires N, 13.0; $H_2O$, 2.8.]

This is a continuation-in-part of application Serial No. 457,294, filed September 20, 1954, now abandoned.

We claim:

1. A compound of the formula

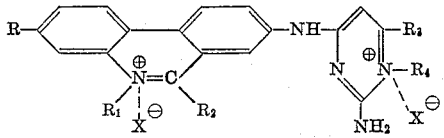

where R represents an amino group, $R_1$, $R_3$ and $R_4$ represent lower alkyl groups, $R_2$ represents a radical selected from the group consisting of phenyl, nitro phenyl and amino phenyl radicals and X is a non-toxic anion.

2. 2 - amino - 7 - (2¹ - amino - 6¹ - methylpyrimidyl - 4¹-amino)-9-phenylphenanthridine 10:1¹-dimethomethane-sulphonate dihydrate.

3. 2 - amino - 7 - (2¹ - amino - 6¹ - methylpyrimidyl-4¹-amino)-9-p-nitrophenylphenanthridine 10:1¹-dimethochloride.

4. 2 - amino - 7 - (2¹ - amino - 6¹ - methylpyrimidyl - 4¹-amino)-9-p-aminophenylphenanthridine 10:1¹-dimethobromide.

5. 2 - amino - 7 - (2¹ - amino - 6¹ - methylpyrimidyl - 4¹-amino)-9-phenylphenanthridine 10-ethiodide 1¹-methiodide.

6. 2 - amino - 7 - (2¹ - amino - 1¹:6¹ - dimethyl - pyrimidyl-4¹-amino)-9-phenyl-10-ethylphenanthridinium dimethane sulphonate.

No references cited.